UNITED STATES PATENT OFFICE.

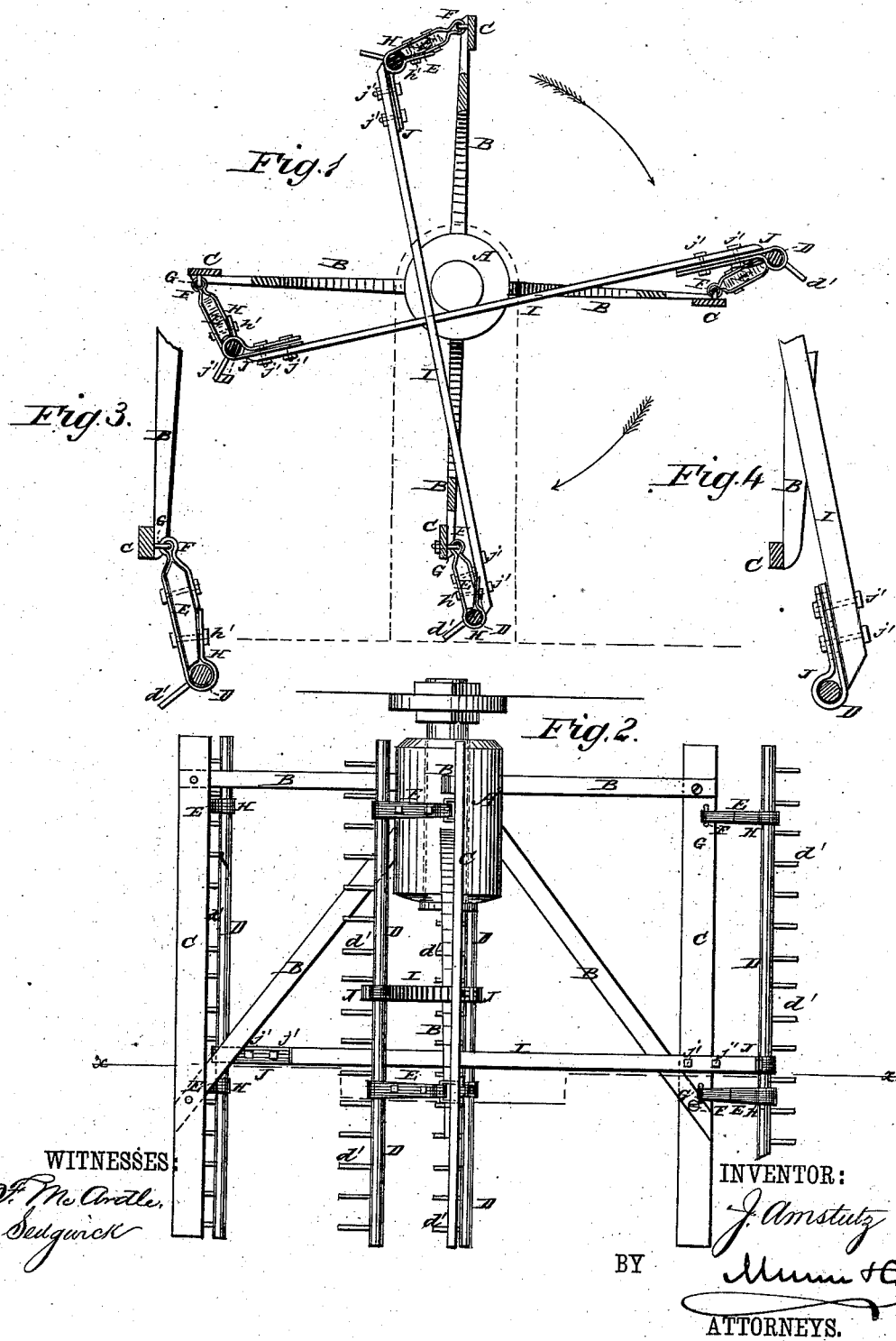

JOSEPH AMSTUTZ, OF HARLAN, INDIANA.

RAKE-REEL FOR REAPERS AND MOWERS.

SPECIFICATION forming part of Letters Patent No. 225,315, dated March 9, 1880.

Application filed September 12, 1879.

*To all whom it may concern:*

Be it known that I, JOSEPH AMSTUTZ, of Harlan, in the county of Allen and State of Indiana, have invented a new and useful Improvement in Rake-Reels for Reapers and Mowers, of which the following is a specification.

Figure 1 is a vertical section of my improved device, taken through the line $xx$, Fig. 2. Fig. 2 is a top view of the same. Fig. 3 is a detail section of the same, showing the connection of the rake-head with the reel-bar. Fig. 4 is a detail section of the same, showing the connection of the rake-head with the shifting-bar.

The object of this invention is to furnish improved rake-reels for reapers and mowers, which shall be so constructed as to raise and straighten fallen, lodged, tangled, and twisted grain and grass and hold them in proper position while being cut, and thus allow the machine to cut short, tall, lodged, fallen, tangled, and twisted grain and grass with facility and thoroughness, leaving no scattered stalks and leaving grain in good condition for being bound.

The invention consists in the combination of the rake-heads, the hinging arms, and the shifting-bars with the arms of a reel; in the combination of the clamping-straps with the tapered outer ends of the hinging arms and the rake-heads, for connecting the said rake-heads to the said arms adjustably; and in the combination of the adjustable coupling-straps with the shifting-bars and the rake-heads, to allow free action of the rake-heads within said coupling-straps, and to allow the said shifting-bars to be lengthened and shortened, as hereinafter fully described.

Similar letters of reference indicate corresponding parts.

A represents the reel hub or shaft, which is designed to be supported and driven in the usual way. To the hub or shaft A are attached the inner ends of the arms B, to the outer ends of which are attached the reel-bars C.

D are the rake-heads, which have teeth $d'$ attached to them, and which are connected with the reel-bars C by the arms E. To the opposite sides of the inner ends of the arms E are attached the ends of a strap, F, which have eyes formed in them to receive the staples G.

The staples G are attached to the reel-bars C, and are secured in place by nuts or other suitable means.

The arms E are made thinner than the rake-heads D, and their outer parts are tapered and have the end parts of metal straps H attached to their opposite sides. The straps H are secured to the arms E by set-screws $h'$ or other suitable means, so that they may be conveniently loosened to allow the rake-heads D to be adjusted to give any desired inclination to the teeth $d'$, as the condition of the grain or grass may require. By tightening up the screws $h'$ the rake-heads D will be securely held in any position into which they may be adjusted. The rakes D are thus connected with the reel A B C by hinge-joints, which allow them to move upward as they descend toward the cutter-bar to grasp the grain, and outward as they rise from the platform to release the cut grain and drop it upon the platform.

I are two shifting-bars, the ends of which are connected with two opposite rake-heads, D, so that the said rake-heads may be connected together in pairs.

J are metal straps, which pass around the rake-heads D, and are secured to the sides of the ends of the bars I by set or hand screws $j'$. The straps J have a number of holes formed in them, or are slotted to receive the screws $j'$, so that the bars I may be lengthened or shortened to adjust the position of the rake-heads D as may be desired.

With this construction, as the rake-heads D in moving forward pass over the reel and down upon its forward side the weight of the two rake-heads D and of the shifting-bar I, assisted by the centrifugal force, shifts the said rake-heads and brings the forward one into working position.

With this construction the rake-heads D raise and straighten up the stalks, and then press them and the erect stalks back against the cutter-bar, so that all the stalks will be cut off and will fall upon the platform in good condition to be removed and bound.

Having thus fully described my invention, I claim as new and desire to secure by Letters Patent—

1. The combination of the rake-heads D, the hinging arms E, and the shifting-bars I with the bars C of a reel, substantially as herein shown and described.

2. The combination of the clamping-straps H with the tapered outer ends of the arms E and the rake-heads D, for connecting the said rake-heads to the said arms adjustably, substantially as herein shown and described.

3. The combination of the adjustable coupling-straps J with the shifting-bars I and the rake-heads D, to allow the said shifting-bars I to be lengthened and shortened, substantially as herein shown and described.

JOSEPH AMSTUTZ.

Witnesses:
E. C. CARRINGTON,
JOSEPH D. CUMMINS.